US008306937B2

(12) United States Patent
Otto et al.

(10) Patent No.: US 8,306,937 B2
(45) Date of Patent: *Nov. 6, 2012

(54) METHOD AND SYSTEM TO MANAGE MULTIPLE PARTY REWARDS USING A SINGLE ACCOUNT AND ARTIFICIAL INTELLIGENCE

(75) Inventors: Jonathan Otto, Palm Beach, FL (US); Andrew Van Luchene, Sante Fe, NM (US)

(73) Assignee: RetailDNA, LLC, Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,077

(22) Filed: Oct. 18, 2011

(65) Prior Publication Data

US 2012/0089452 A1    Apr. 12, 2012

Related U.S. Application Data

(63) Continuation of application No. 12/322,094, filed on Jan. 29, 2009, now Pat. No. 8,041,667, which is a continuation-in-part of application No. 12/151,043, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned.

(51) Int. Cl.
    *G06F 17/00*    (2006.01)
    *G06N 5/02*    (2006.01)
(52) U.S. Cl. ......................................... 706/47
(58) Field of Classification Search ...................... 706/47
    See application file for complete search history.

(56) References Cited

U.S. PATENT DOCUMENTS

| | | | |
|---|---|---|---|
| 5,794,207 | A | 8/1998 | Walker et al. |
| 6,052,667 | A | 4/2000 | Walker et al. |
| 6,085,169 | A | 7/2000 | Walker et al. |
| 6,119,100 | A | 9/2000 | Walker et al. |
| 6,223,163 | B1 | 4/2001 | Van Luchene |
| 6,230,150 | B1 | 5/2001 | Walker et al. |
| 6,267,670 | B1 | 7/2001 | Walker et al. |
| 6,298,329 | B1 | 10/2001 | Walker et al. |
| 6,298,331 | B1 | 10/2001 | Walker et al. |
| 6,507,279 | B2 | 1/2003 | Loof |
| 6,553,346 | B1 | 4/2003 | Walker et al. |
| 6,567,787 | B1 | 5/2003 | Walker et al. |

(Continued)

OTHER PUBLICATIONS

Resource allocation in communication networks using abstraction and constraint satisfaction. Frei, C.; Boi Faltings; Hamdi, M.; Selected Areas in Communications, IEEE Journal on vol. 23, Issue: 2; Digital Object Identifier: 10.11 09/JSAC.2004.839377 Publication Year: 2005, pp. 304-320.

(Continued)

*Primary Examiner* — Michael B Holmes
(74) *Attorney, Agent, or Firm* — Michael D. Downs; Fincham Downs LLC

(57) ABSTRACT

Systems and methods for storing a transaction history with respect to a business entity, and an incentive regarding a business entity, previously offered to an account. A desired transaction involving a holder of the account and the business entity may be generated based on the transaction history and a metric. An incentive may be generated based on an artificial intelligence program (AIP), the transaction history, and the metric. The desired transaction and the incentive may be transmitted for presentation to a holder of the account.

24 Claims, 4 Drawing Sheets

U.S. PATENT DOCUMENTS

| | | | |
|---|---|---|---|
| 6,598,024 | B1 | 7/2003 | Walker et al. |
| 7,028,894 | B2 | 4/2006 | Turner et al. |
| 7,072,850 | B1 | 7/2006 | Van Luchene |
| 7,248,855 | B2 | 7/2007 | Joyce et al. |
| 7,272,569 | B1 | 9/2007 | Walker et al. |
| 7,318,041 | B2 | 1/2008 | Walker et al. |
| 7,437,344 | B2 | 10/2008 | Peyrelevade |
| 7,542,919 | B1 | 6/2009 | Mueller et al. |
| 7,677,974 | B2 | 3/2010 | Van Luchene |
| 7,689,508 | B2 | 3/2010 | Davis et al. |
| 7,739,140 | B2 | 6/2010 | Vinson et al. |
| 7,770,184 | B2 | 8/2010 | Miller et al. |
| 7,806,758 | B2 | 10/2010 | Van Luchene |
| 7,877,611 | B2 | 1/2011 | Camacho et al. |
| 7,922,581 | B2 | 4/2011 | Potts |
| 2003/0018531 | A1 | 1/2003 | Mahaffy et al. |
| 2003/0083936 | A1 | 5/2003 | Mueller et al. |
| 2005/0055236 | A1 | 3/2005 | Bondy et al. |
| 2005/0203771 | A1 | 9/2005 | Achan |
| 2006/0033625 | A1 | 2/2006 | Johnson et al. |
| 2006/0052888 | A1 | 3/2006 | Bayoumi et al. |
| 2006/0059032 | A1 | 3/2006 | Wong et al. |
| 2008/0306790 | A1 | 12/2008 | Otto et al. |
| 2008/0313052 | A1 | 12/2008 | Otto et al. |
| 2008/0313122 | A1 | 12/2008 | Otto et al. |
| 2009/0024481 | A1 | 1/2009 | Otto et al. |
| 2009/0030797 | A1 | 1/2009 | Otto et al. |
| 2009/0030798 | A1 | 1/2009 | Otto et al. |
| 2009/0125380 | A1 | 5/2009 | Otto et al. |
| 2009/0125394 | A1 | 5/2009 | Otto et al. |
| 2009/0125396 | A1 | 5/2009 | Otto et al. |
| 2009/0132344 | A1 | 5/2009 | Otto et al. |
| 2009/0182630 | A1 | 7/2009 | Otto et al. |
| 2009/0182677 | A1 | 7/2009 | Otto et al. |

OTHER PUBLICATIONS

Service Oriented Architecture for Context Perception Based on Heterogeneous Sensors Network, Ricquebourg, V.; Menga, D.; Marhic, B.; Delahoche, L.; Durand, D.; Loge, C.; IEEE Industrial Electronics, IECON 2006—32nd Annual Conference on Digital Object Identifier: 10.11 09/IECON.2006.347768 Publication Year: 2006, pp. 4557-4562.

Patenting financial software, Lotvin, M.; Nemes, R.; Artificial Intelligence on Wall Street, 1991. Proceedings., First International Conference on Digital Object Identifier: 10.11 09/AIAWS.1991.236590 Publication Year: 1991, pp. 277, 324-325.

An assessment of resource exploitation using artificial intelligence based traffic control strategies, Catania, V.; Ficili, G.; Panno, D.; Computers and Communications, 1997. Proceedings., Second IEEE Symposium on Digital Object Identifier: 10.11 09/ISCC.1997.615989 Publication Year: 1997, pp. 162-166.

U.S. Appl. No. 08/943,483, filed Oct. 3, 1997, by Walker et al., abandoned, 50 pages.

U.S. Appl. No. 09/045,347, filed Mar. 20, 1998, by Alderucci et al., abandoned, 29 pages.

U.S. Appl. No. 09/083,689, filed May 21, 1998, by Van Luchene, abandoned, 50 pages.

U.S. Appl. No. 09/098,240, filed Jun. 16, 1998, by Walker et al., abandoned, 50 pages.

U.S. Appl. No. 09/282,747, filed Mar. 31, 1999, by Walker et al., abandoned, 89 pages.

U.S. Appl. No. 09/538,751, filed Mar. 30, 2000, by Walker et al., abandoned, 82 pages.

U.S. Appl. No. 60/239,610, filed Oct. 11, 2000, by Otto et al., abandoned, 99 pages.

Notice of Allowability mailed Jun. 20, 2011, in U.S. Appl. No. 12/322,094, 11 pages.

METHOD AND SYSTEM TO MANAGE MULTIPLE PARTY REWARDS USING A SINGLE ACCOUNT AND ARTIFICIAL INTELLIGENCE

CROSS-REFERENCE TO RELATED APPLICATIONS

The present application is a continuation application of U.S. patent application Ser. No. 12/322,094, filed Jan. 29, 2009, entitled "Method and System to manage Multiple Party Rewards Using a Single Account and Artificial Intelligence," and now issued as U.S. Pat. No. 8,041,667, which is a continuation-in-part patent application of abandoned U.S. patent application Ser. No. 12/151,043, filed May 2, 2008, and entitled "Method and System For Centralized Generation of a Business Executable Using Genetic Algorithms and Rules Distributed Among Multiple Hardware Devices,"

which is a continuation-in-part of abandoned U.S. patent application Ser. No. 11/983,679, filed Nov. 9, 2007, and entitled "Method and System for Generating, Selecting, and Running Executables in a Business System Utilizing a Combination of User Defined Rules and Artificial Intelligence,"

which is a continuation-in-part patent application of abandoned U.S. patent application Ser. No. 09/993,228, filed Nov. 14, 2001, and entitled "Method and apparatus for dynamic rule and/or offer generation,"

which applications are incorporated by reference in the present application.

This application is related to: U.S. patent application Ser. No. 09/052,093 entitled "Vending Machine Evaluation Network" and filed Mar. 31, 1998; U.S. patent application Ser. No. 09/083,483 entitled "Method and Apparatus for Selling an Aging Food Product" and filed May 22, 1998; U.S. patent application Ser. No. 09/282,747 entitled "Method and Apparatus for Providing Cross-Benefits Based on a Customer Activity" and filed Mar. 31, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers," filed on Sep. 4, 1996 and issued as U.S. Pat. No. 5,794,207 on Aug. 11, 1998; U.S. patent application Ser. No. 08/920,116 entitled "Method and System for Processing Supplementary Product Sales at a Point-Of-Sale Terminal" and filed Aug. 26, 1997, which is a continuation-in-part of U.S. patent application Ser. No. 08/822,709 entitled "System and Method for Performing Lottery Ticket Transactions Utilizing Point-Of-Sale Terminals" and filed Mar. 21, 1997; U.S. patent application Ser. No. 09/135,179 entitled "Method and Apparatus for Determining Whether a Verbal Message Was Spoken During a Transaction at a Point-Of-Sale Terminal" and filed Aug. 17, 1998; U.S. patent application Ser. No. 09/538,751 entitled "Dynamic Propagation of Promotional Information in a Network of Point-of-Sale Terminals" and filed Mar. 30, 2000; U.S. patent application Ser. No. 09/442,754 entitled "Method and System for Processing Supplementary Product Sales at a Point-of-Sale Terminal" and filed Nov. 12, 1999; U.S. patent application Ser. No. 09/045,386 entitled "Method and Apparatus For Controlling the Performance of a Supplementary Process at a Point-of-Sale Terminal" and filed Mar. 20, 1998; U.S. patent application Ser. No. 09/045,347 entitled "Method and Apparatus for Providing a Supplementary Product Sale at a Point-of-Sale Terminal" and filed Mar. 20, 1998; U.S. patent application Ser. No. 09/083,689 entitled "Method and System for Selling Supplementary Products at a Point-of Sale and filed May 21, 1998; U.S. patent application Ser. No. 09/045,518 entitled "Method and Apparatus for Processing a Supplementary Product Sale at a Point-of-Sale Terminal" and filed Mar. 20, 1998; U.S. patent application Ser. No. 09/076,409 entitled "Method and Apparatus for Generating a Coupon" and filed May 12, 1998; U.S. patent application Ser. No. 09/045,084 entitled "Method and Apparatus for Controlling Offers that are Provided at a Point-of-Sale Terminal" and filed Mar. 20, 1998; U.S. patent application Ser. No. 09/098,240 entitled "System and Method for Applying and Tracking a Conditional Value Coupon for a Retail Establishment" and filed Jun. 16, 1998; U.S. patent application Ser. No. 09/157,837 entitled "Method and Apparatus for Selling an Aging Food Product as a Substitute for an Ordered Product" and filed Sep. 21, 1998, which is a continuation of U.S. patent application Ser. No. 09/083,483 entitled "Method and Apparatus for Selling an Aging Food Product" and filed May 22, 1998; U.S. patent application Ser. No. 09/603,677 entitled "Method and Apparatus for selecting a Supplemental Product to offer for Sale During a Transaction" and filed Jun. 26, 2000; U.S. Pat. No. 6,119,100 entitled "Method and Apparatus for Managing the Sale of Aging Products and filed Oct. 6, 1997 and U.S. Provisional Patent Application Ser. No. 60/239,610 entitled "Methods and Apparatus for Performing Upsells" and filed Oct. 11, 2000.

By "related to" we mean that the present application and the applications noted above are in the same general technological area and have a common inventor or assignee. However, "related to" does not necessarily mean that the present application and any or all of the applications noted above are patentably indistinct, or that the filing date for the present application is within two months of any of the respective filing dates for the applications noted above.

FIELD OF THE INVENTION

The invention relates generally to a method and system for managing rewards for a multi-tiered account and, more particularly, to a method and system for providing such management using artificial intelligence.

BACKGROUND OF THE INVENTION

The management of rewards for an account is known, for example, as disclosed in U.S. Published Patent Applications 2002/0087410 (Walker et al.), incorporated by reference herein. Unfortunately, such programs are not self-learning.

Thus, there is a long-felt need to provide a system and a method to manage rewards for a multi-tiered account that is dynamic and can be readily adapted to meet various and variable requirements.

SUMMARY OF THE INVENTION

The invention broadly comprises a system for managing an account having at least one sub-account, including: a memory unit, for at least one specially programmed general-purpose computer, for storing a transaction history for the account with respect to a business entity, an incentive regarding the business entity previously offered to the account, and an artificial intelligence program (AIP), wherein the transaction history includes at least one transaction involving the business entity and the main account or the business entity and the at least one sub-account; a processor for the at least one specially programmed general-purpose computer for: comparing the transaction history with a metric; generating, using the comparison of the transaction history with the metric, a desired transaction involving the account and the business entity; and modifying the incentive using the AIP and the comparison of the transaction history with the metric, wherein rewarding of the modified incentive is conditional upon execution of the desired transaction; and an interface element, for the at least one specially programmed general-purpose computer, for transmitting the desired transaction and the modified incentive for presentation to a holder of the account.

In one embodiment, the processor is for determining the metric using the AIP and the memory element is for storing the metric. In another embodiment, the memory element is for storing data regarding the account, the data different than the transaction history and the processor is for: generating, using the data and the AIP, the metric; comparing the transaction history with the metric using the data; generating the desired transaction using the data; modifying the incentive using the data; or transmitting the desired transaction and the modified incentive using the data. In a further embodiment, comparing the transaction history with the metric includes using the AIP. In yet another embodiment, the processor is for generating the incentive using the AIP.

In one embodiment, the interface element is for receiving data regarding a transaction, between the business entity and the account, transacted following transmission of the desired transaction and the modified incentive and the processor is for comparing the data with respect to the desired transaction. For compliance of the transaction with the desired transaction, the processor is for authorizing reward of the modified incentive. For non-compliance of the transaction with the desired transaction, the processor is for further modifying, using the AIP, the modified incentive according to the comparison of the transaction and the desired transaction.

In one embodiment, the processor is for generating, using the AIP, at least one rule, the memory element is for storing the at least one rule, and the processor is for generating the desired transaction using the at least one rule or modifying the incentive using the at least one rule. In another embodiment, the memory element is for storing at least one rule, the processor is for modifying, using the AIP, the at least one rule according to the comparison of the transaction history with the metric, and the processor is for generating the desired transaction using the at least one modified rule or modifying the incentive using the at least one modified rule.

In one embodiment, the processor is for generating, using the transaction history and the AIP, a conversion metric, the interface element is for receiving a request to transfer a reward within the account, and the processor is for modifying the reward using the conversion metric and transferring the modified reward within the account. In another embodiment, the interface element is for receiving at least one rule from a wireless communications device (WCD) or from a general-purpose computer associated with the business entity or another business entity, the memory element is for storing the at least one rule, and the processor is for: comparing the transaction history with the metric using the at least one rule; modifying the incentive using the at least one rule; generating the desired transaction using the at least one rule; or transmitting the desired transaction and the modified incentive using the at least one rule.

In one embodiment, the processor is for transmitting the desired transaction and the modified incentive to a WCD with a memory element and a processor, and the memory element for the WCD is for storing the at least one rule, and the processor for the WCD is for executing the desired transaction or the modified incentive according to the at least one rule.

The invention also broadly comprises a system for managing an account having at least one sub-account, including: a memory unit, for at least one specially programmed general-purpose computer, for storing a transaction history for the account with respect to a business entity and an artificial intelligence program (AIP), the transaction history including at least one transaction involving the business entity and the main account or the business entity and the at least one sub-account; a processor for the at least one specially programmed general-purpose computer for: comparing the transaction history with a metric; generating, using the AIP and the comparison of the transaction history with the metric, a desired transaction involving the account and the business entity; and generating, using the AIP and the comparison of the transaction history with the metric, an incentive, rewarding of the incentive conditional upon execution of the desired transaction; and an interface element, for the at least one specially programmed general-purpose computer, for transmitting the desired transaction and the incentive for presentation to a holder of the account.

The invention further broadly comprises a method for managing an account having at least one sub-account.

It is a general object of the present invention to provide a system and a method to manage rewards for a multi-tiered account that is dynamic and can be readily adapted to meet various and variable requirements.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing Figures, in which.

DETAILED DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein shall include the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

Figure 1:
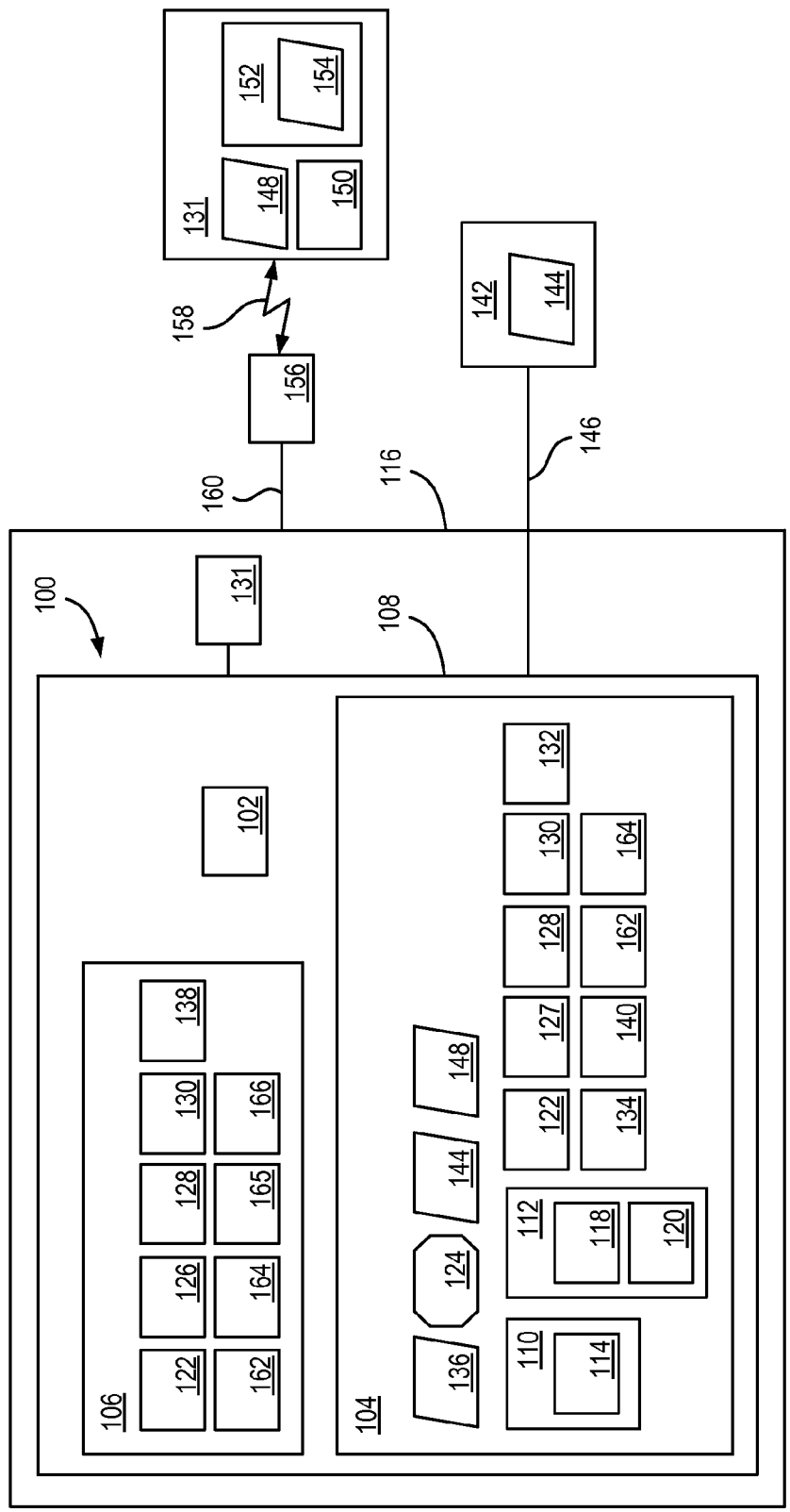
FIG. 1 is a schematic block diagram of a present invention system for managing an account having at least one sub-account; and, FIG. 2 is a flow chart of a present invention method for managing an account having at least one sub-account.

FIG. 1 is a schematic block diagram of present invention system 100 for managing an account having at least one sub-account. The system includes interface element 102, memory element 104, and processor 106 for at least one specially programmed general-purpose computer 108. The memory element stores transaction history 110 for account 112. The transaction history includes at least one transaction 114 involving a business entity, for example, the business entity associated with location 116 and account 112. Any transaction involving a customer and a business entity is included in the spirit and scope of the claimed invention. Account 112 includes main, or master, account 118 and at least one sub-account 120. Thus, account 112 includes one or more sub-accounts. Account 112 is not limited to a particular number of sub-accounts. Transaction 114 can include any combination of the main account and one or more sub-accounts from sub-accounts 120. For example, the transaction can include the main account and a sub-account from sub-accounts 120, or can include only sub-accounts from sub-accounts 120. The memory element also stores incentive 122, previously offered to the account by the business entity, and artificial intelligence program (AIP) 124. In one embodiment, the processor updates the transaction history with transaction 114.

In one embodiment, the processor is for generating comparison 126 by comparing the transaction history with metric 127 and generating, using the comparison, desired transaction 128 involving the account and the business entity. Metric 127 can be any metric known in the art and the metric can be part of any classification system known in the art. In another embodiment, the processor generates modified incentive 130 by modifying incentive 122 using the AIP and the comparison. In a further embodiment, the desired transaction and the modified incentive are stored in the memory element. The eventual rewarding of the modified incentive is conditional upon execution of the desired transaction as described infra. In one embodiment, the processor transmits, via the interface element, desired transaction 128 and modified incentive 130 for presentation to a holder (not shown) of the account. Incentive 130 can be any incentive known in the art, for example, including, but not limited to a discount on an item or service or a free item or service. Hereinafter, the term "incentive" if not further delineated refers to incentive 122 or modified incentive 130.

In one embodiment, desired transaction 128 and modified incentive 130 are transmitted for presentation on any point of sale (POS) station known in the art, for example, POS station 131 in location 116. In another embodiment, the offer is transmitted for presentation on any device, remote from a location associated with the first business entity, such as location 116, known in the art, for example, a remote kiosk (not shown) or a wireless communications device (WCD), for example, WCD 131. WCD 131 can be any WCD known in the art. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to interaction of the WCD and system 100.

By interface element, we mean any combination of hardware, firmware, or software in a computer used to enable communication or data transfer between the computer and a device, system, or network external to the computer. The interface element can connect with the device, system, or network external to the computer using any means known in the art, including, but not limited to a hardwire connection, an optical connection, an Internet connection, or a radio frequency connection. Processor 106 and interface element 102 can be any processor or interface element, respectively, or combination thereof, known in the art.

Computer 108 can be any computer or plurality of computers known in the art. In one embodiment, the computer is located in a retail location with which system 100 is associated, for example, location 116. In another embodiment (not shown), all or parts of the computer are remote from retail locations with which system 100 is associated. In a further embodiment, computer 108 is associated with a plurality of retail locations with which system 100 is associated. Thus, the computer provides the functionality described for more than one retail location.

In another embodiment, the processor determines metric 127 using the AIP and the memory element stores the metric. In another embodiment, the processor compares the transaction history with the metric using the AIP. In a further embodiment, the processor generating the incentive using the AIP. That is, the processor generates the incentive modified in the processor operation describe supra.

In one embodiment, the memory element stores data 132 regarding the account. Data 132 includes information other than the information shown in history 110, for example, information regarding one or more holders of the main or sub-accounts in account 112. The processor performs one or more of the following operations using the data: generating, using the AIP, the metric; comparing the transaction history with the metric; generating the desired transaction (in addition to using the AIP); modifying the incentive; or transmitting the respective data, for example, the format or content of the display of the desired transaction or incentive is configured according to information in data 132.

In one embodiment, the interface element receives data 134 regarding a transaction between the business entity and the account transacted following transmission of the respective data, and the processor compares data 134 with respect to the desired transaction. For example, if the desired transaction was a transaction including the main account and two sub-accounts, the processor determines if the transaction described by data 134 included the main account and two sub-accounts. For compliance of the transaction with the desired transaction, the processor authorizes reward of the modified incentive. The modified incentive can be rewarded using any means known in the art. The award can be provided by the business entity with which the account is transacting or by another entity, for example, a business entity contracted by the business entity to handle provision of rewards. For non-compliance of the transaction with the desired transaction, in one embodiment, the processor uses the AIP to further modify the modified incentive according to the comparison of the transaction and the desired transaction. For example, the processor and the AIP determine how to make the incentive more attractive to holders of the account such that the holders are motivated to perform the desired transaction.

In one embodiment, the memory element stores at least one rule 136. In general, rule 136 can be used in place of or in conjunction with the AIP in any or all of the operations described infra and supra regarding the AIP. For example, the processor uses the rule in one or more of the following operations: to generate or modify the desired transaction, the incentive, or the metric, to compare the transaction history with the metric, or to transmit the desired transaction or incentive. In another embodiment, the processor generates or modifies rule 136 using the AIP. In a further embodiment, the rule is modified using the AIP according to the comparison of the transaction history with the metric. Thus, the system is self-learning with respect to the rule and the rule can be automatically modified according to feed-back or changes in a metric or other benchmark. It should be understood that a modified rule 136 can be used for any or all of the operations described supra or infra for rule 136. Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007 is applicable to the operation of the AIP and rule 136.

In one embodiment, the processor generates conversion metric 138, using the AIP and the transaction history or data 134. The conversion metric is used for modifying rewards transferred between the main account and the sub-accounts or among the sub-accounts. Upon receipt by the interface element of a request to transfer a reward, for example, reward 140, within the account, the processor modifies the reward using the conversion metric and transfers the modified reward within the account. For example, according to compliance of a sub-account with respect to a specified metric, there may be a bonus, no modification, or a penalty applied to rewards transferred to or from the sub-account.

In one embodiment, computer 142, separate from computer 108, transmits modifying rule 144 to computer 108. Computer 142 can be in location 116 (not shown) or can be in a different location. Computer 142 can be associated with a business entity associated with location 116 or can be associated with a different business entity. Connection 146 between computers 108 and 142 can be any type known in the art. In another embodiment (not shown), multiple computers 142 are included and respective computers among the multiple computers can be associated with the same or different business entities. Computer 108 stores modifying rule 142 in memory 104.

In one embodiment, rule 142 is used with or in place of rule 136, or is used in conjunction with the AIP. For example, the processor can perform one or more of the following operations using rule 142: generate or modify the desired transaction, the incentive, or the metric, compare the transaction history with the metric, or transmit the desired transaction or incentive. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 142.

In one embodiment, computer 108 receives at least one modifying rule 148 from a WCD associated with the customer, for example, WCD 131, and stores the rule in memory 104. In one embodiment, rule 148 is used with or in place of rule 136, or is used in conjunction with the AIP. For example, the processor can perform one or more of the following operations using rule 148: generate or modify the desired transaction, the incentive, or the metric, compare the transaction history with the metric, or transmit the desired transaction or incentive. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 148.

In one embodiment, a WCD, for example, WCD 131, with a processor and a memory element, for example, processor 150 and memory 152, is usable to receive the desired transaction and the incentive. The memory element for the WCD stores at least one rule, for example, rule 154 and the processor for the WCD executes the desired transaction or the incentive according to the rule, for example, rule 154. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to the operations described regarding WCD 131, processor 150, rule 154, and presentation of the desired transaction or the incentive.

In one embodiment, a WCD usable with system 100, for example, WCD 131, is owned by, leased by, or otherwise already in possession of an end user when system 100 interfaces with the WCD. In the description that follows, it is assumed that the WCD is owned by, leased by, or otherwise already in possession of the end user when system 100 interfaces with the WCD. In general, the WCD communicates with a network, for example, network 156, via radio-frequency connection 158. Network 156 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 156 using any means known in the art, including, but not limited to a hardwire connection, an optical connection, an Internet connection, or a radio frequency connection. In the figures, a non-limiting example of a hardwire connection 160 is shown. In one embodiment, device 131 is connectable to a docking station (not shown) to further enable communication between device 131 and system 100. Any docking station or docking means known in the art can be used. That is, when the device is connected to the docking station, a link is established between the device and system 100.

In one embodiment, the processor generates classification 162 for the account according to history 110. In another embodiment, metric 164 is used by the processor to generate the classification. Metric 164 can be any metric known in the art and the metric can be part of any classification system known in the art in order to result in classification 162. For example, in one embodiment, the intent of classification 162 is to place the account in a hierarchy of candidacy for desired transactions or incentives. For example, the more favorable the comparison, the higher the customer's position in the hierarchy and the more valuable or attractive the desired transactions or incentives potentially available to the customer. Thus, the incentive can be made more or less valuable or attractive according to the classification.

In one embodiment, classification 162 is used by the processor: to generate or modify the desired transaction, the incentive, or the metric; to compare the transaction history with the metric; or to transmit the desired transaction or incentive. For example, the classification can be an indication of how favorably the account is transacting with the business entity, for example, with respect to parameters regarding revenue or profitability for the business entity. Thus, for example, accounts with a more favorable classification can be offered more attractive desired transactions or incentives. In another embodiment, the processor uses the AIP to generate or modify metric 164 or classification 162.

In one embodiment, the desired transaction includes a good or service (not shown) offered by the business entity and the incentive can be an offer related to the good or service. The good or service can be any good or service known in the art. The following commonly-owned U.S. patent applications are applicable to the use of the AIP and or the rules described supra to generate an incentive including an offer: U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application Ser. No. 12/151/043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; commonly-owned U.S. patent application Ser. No. 12/151,038, titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008; commonly-owned U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008; commonly-owned U.S. patent application Ser. No. 12/151,042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application Ser. No. 12/151, 042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application entitled "SYSTEM AND METHOD FOR PROVIDING INCENTIVES TO AN END USER FOR REFERRING ANOTHER END USER", inventors Otto et al., filed Jul. 9, 2008; commonly-owned U.S. patent application entitled "METHOD AND SYSTEM FOR GENERATING A REAL TIME OFFER OR A DEFERRED OFFER", inventors Otto et al., filed Jul. 9, 2008; commonly-owned U.S. patent application entitled "METHOD AND APPARATUS FOR GENERATING AND TRANSMITTING AN IDEAL ORDER OFFER", inventors Otto et al., filed Jul. 9, 2008; commonly-owned U.S. patent application entitled "SYSTEM AND METHOD FOR GENERATING AND TRANSMITTING LOCATION BASED PROMOTIONAL OFFER REMINDERS", inventors Otto et al., filed Jul. 9, 2008; commonly-owned U.S. patent application entitled "SYSTEM AND METHOD FOR LOCATION BASED SUGGESTIVE SELLING", filed Jul. 9, 2008; and commonly-owned U.S. patent application entitled "SYSTEM AND METHOD FOR SCANNING A COUPON TO INITIATE AN ORDER", filed May 2, 2008.

In one embodiment, the processor determines optimization 165 of revenue or profitability for the business entity as a parameter for: generating or modifying the desired transaction, the incentive, or the metric; comparing the transaction history with the metric, or transmitting the respective data. For example, the processor can determine the success of the transactions in history 110 in attaining the optimization of revenue or profitability. Any measure or metric known in the art can be used with respect to the revenue or profitability, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results. In another embodiment, the processor determines the optimization of revenue or profitability using the AIP.

In one embodiment, metric 126 or metric 164 are with respect to the revenue or profitability of the business entity, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results.

In one embodiment, the processor is for generating or modifying format or temporal parameter 166 for presentation of the desired transaction or the incentive. For example, the parameter is with respect to a time of day, week, month, or year at which the desired transaction or incentive is presented, or with respect to a frequency with which the desired transaction or incentive is presented. The processor transmits the format or temporal parameter along with the desired transaction and the incentive for presentation. In another embodiment, the processor uses the AIP to generate or modify parameter 166.

In one embodiment, the memory unit stores the transaction history and the AIP; and the processor compares the transaction history with a metric, for example, metric 127, generates, using the AIP and the comparison of the transaction history with the metric, a desired transaction involving the account and the business entity, for example, transaction 128, and generates, using the AIP and the comparison of the transaction history with the metric, an incentive, for example, incentive 122. The rewarding of the incentive is conditional upon execution of the desired transaction. The interface element transmits the desired transaction and the incentive for presentation to a holder of the account.

Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007, is applicable to the operations involving the AIP or any rules, noted supra and infra, for example, generating or modifying the desired transaction, the incentive, or the metric, comparing the transaction history with the metric, or transmitting the desired transaction or incentive or other operations described herein with respect to the AIP.

System 100 can generate, determine, modify, or manage the following:

1. Customer ratings, for example, classification 162, that is, a score or rating given to each customer to determine the type of desired transaction or incentive for which the customer qualifies. The rating can be adjusted based on:
   a. the transaction total of one or more transactions, for example, as found in the transaction history
   b. temporal parameters, such as the time since the last transaction
   c. use of coupons
   d. purchase of discounted or non-discounted products
   e. purchase of loss leaders
   f. any other metric to determine how profitable a customer, or a transaction associated with the customer, is for a business entity operating or benefiting from system 100
2. Incentive modification, for example, the augmentation of incentive 122 or 130. That is, an incremental, additive incentive, for example, discount percent or fixed dollar amount, that is generated or modified and then added to encourage compliance with the desire transaction
3. Maximum discount. That is, the maximum incentive, for example, percent or fixed dollar discount, that can be applied to any desired transaction
4. Grace period. That is, temporal parameters governing compliance of the customer, for example, the amount of time given to comply with a desired transaction
5. Adjusting an incentive discount and determining when to apply the discount
6. Presentation, that is, how the desired transaction and incentive are outputted and conveyed to customer, for example, print a coupon or output email based on whether or not customer has a frequent shopper card
7. Rules governing incentives, for example, discounts, given to loyal customers
8. Rules defining a loyal customer
9. Price of incentive or discount
10. Time between transactions
11. Incentive or discount amount The discussion in commonly-owned U.S. patent application Ser. No. 11/983,679, filed Nov. 9, 2006 and entitled "Method and System for Generating, Selecting, and Running Executables in a Business System Utilizing a Combination of User Defined Rules and Artificial Intelligence" is applicable to the modification of incentives 122 or 130, or the desired transaction by the processor.

As disclosed in commonly-owned U.S. patent application titled: "METHOD AND APPARATUS FOR GENERATING AND TRANSMITTING AN IDEAL ORDER OFFER," inventors Otto et. al, filed Jul. 9, 2008, which application is incorporated by reference herein, in one embodiment, the processor reviews the transaction history to identify an item or service not included in the history (and presumably never ordered by the customer) or ordered by the customer at less than a predetermined frequency. Then, the processor, using the AIP, optimizes the desired transaction and the incentive, for example, by including an upsell in the incentive for an item or service not included in the information or ordered at less than a predetermined frequency. In another embodiment, this pairing is used to realize the optimization of revenue or profits for the business entity.

It should be understood that various storage and removal operations, not explicitly described above, involving memory 104 and as known in the art, are possible with respect to the operation of system 100. For example, outputs from and inputs to the general-purpose computer can be stored and retrieved from the memory elements and data generated by the processor can be stored in and retrieved from the memory.

It should be understood that system 100 can be operated by the same business entity operating or owning a business location using the system, or can be operated by a third party different than the business entity operating or owning the business location using the system. In one embodiment, a third party operates system 100 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

It should be understood that system 100 can be integral with a computer operating system for a business location, for example, location 116 or with a business entity operating the business location. It also should be understood that system 100 can be wholly or partly separate from the computer operating system for a retail location, for example, location 116, or with a business entity operating the business location.

It should be understood that although individual rule sets and a single artificial intelligence program are discussed, various of the individual rule sets can be combined into composite rules set (not shown). Further, the functions described for AIP 124 can be implemented by combinations of separate AIPs (not shown). Any combination of individual rule sets or artificial intelligence programs is included in the spirit and scope of the claimed invention.

In general, system 100, and in particular, the processor using the AI program, operates to use artificial intelligence, for example, a generic algorithm, to inform or make some or all of the decisions discussed in the description for FIG. 1. In one embodiment, system 100 generates or modifies the desired transaction, the incentive, or the metric, compares the transaction history with the metric, or transmits the desired transaction or incentive, or performs the other operations described herein to attain or maximize an objective of the business entity, for example, performance with respect to metric 126. Factors usable to determine an objective can include, but are not limited to: customer acceptance rate, profit margin percentage, customer satisfaction information, service times, average check, inventory turnover, labor costs, sales data, gross margin percentage, sales per hour, cash over and short, inventory waste, historical customer buying habits, customer provided information, customer loyalty program data, weather data, store location data, store equipment package, POS system brand, hardware type and software version, employee data, sales mix data, market basket data, or trend data for at least one of these variables. Thus, the present invention, for example, system 100, specifically, computer 108 and processor 106, use artificial intelligence, for example, AIP 124 to automatically generate or modify operations, parameters, and outputs with respect to a goal, for example, a metric such as metric 127 and automatically adapts the generation or modification operations, parameters, and outputs to feedback, that is, the present invention is self-learning and self-adapting with respect to generating or modifying operations, parameters, and outputs. Further, the present invention can automatically generate or modify the goal and be self-learning and self-adapting with respect to the goal.

Figure 2:
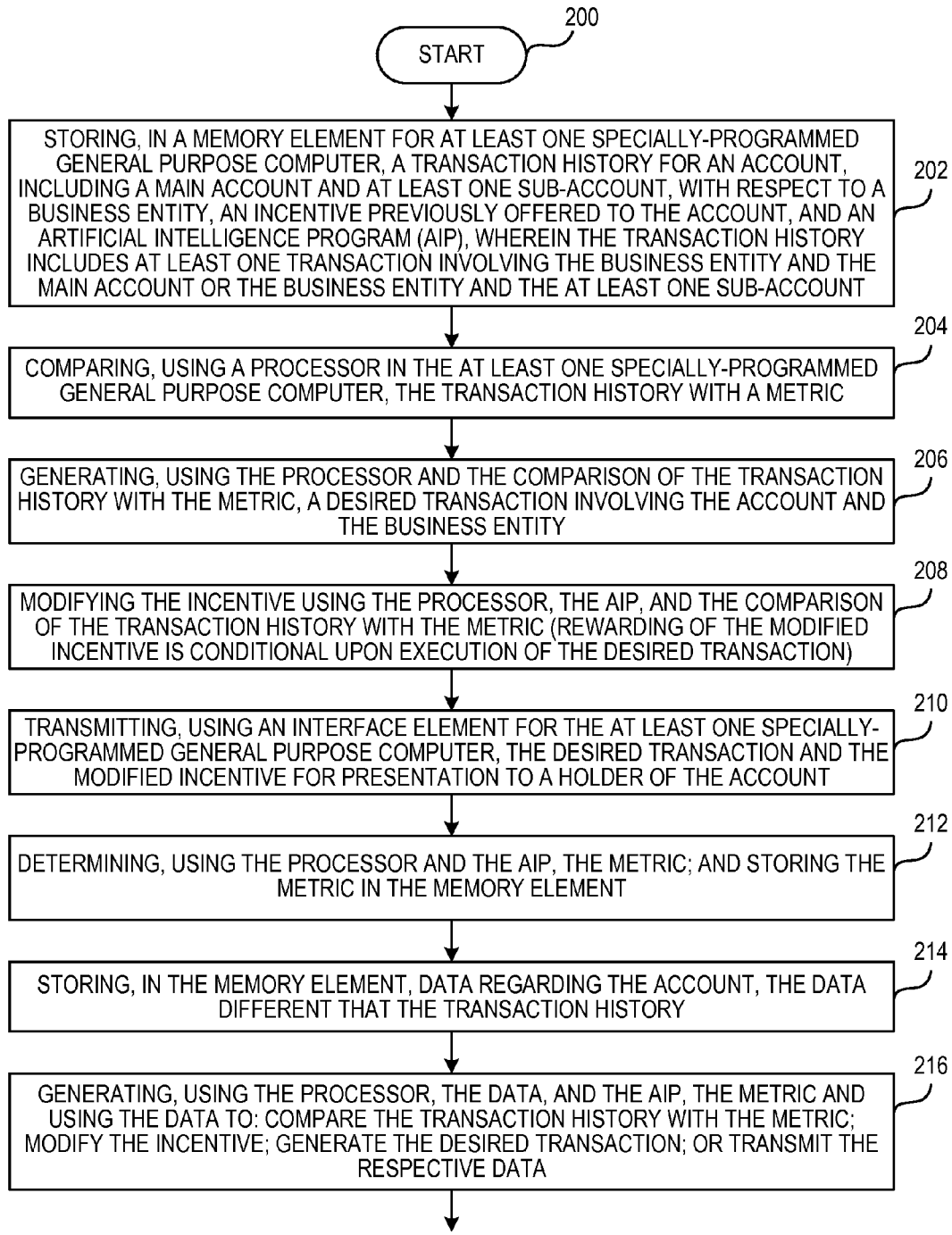
Figure 2:
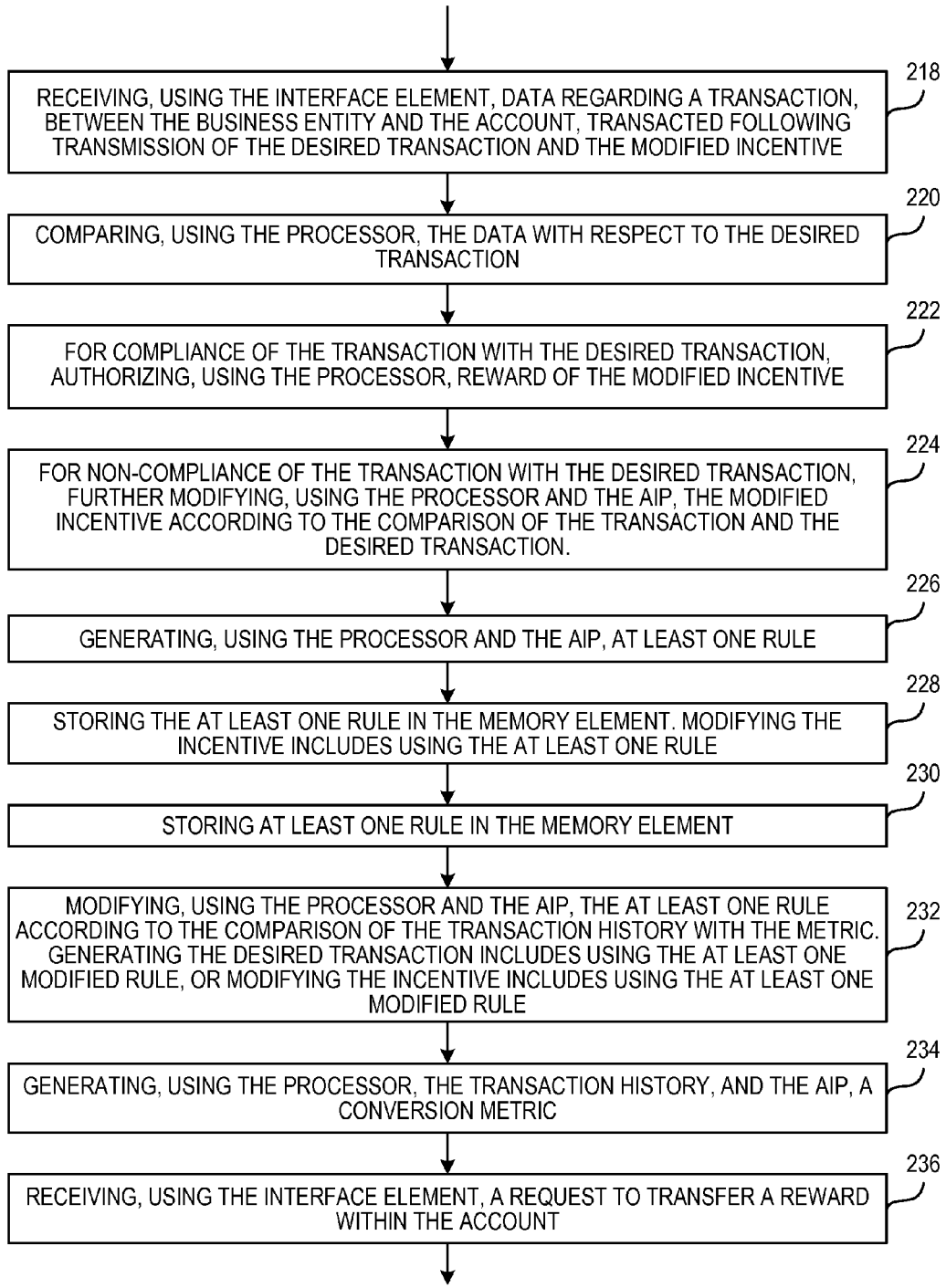
Figure 2:
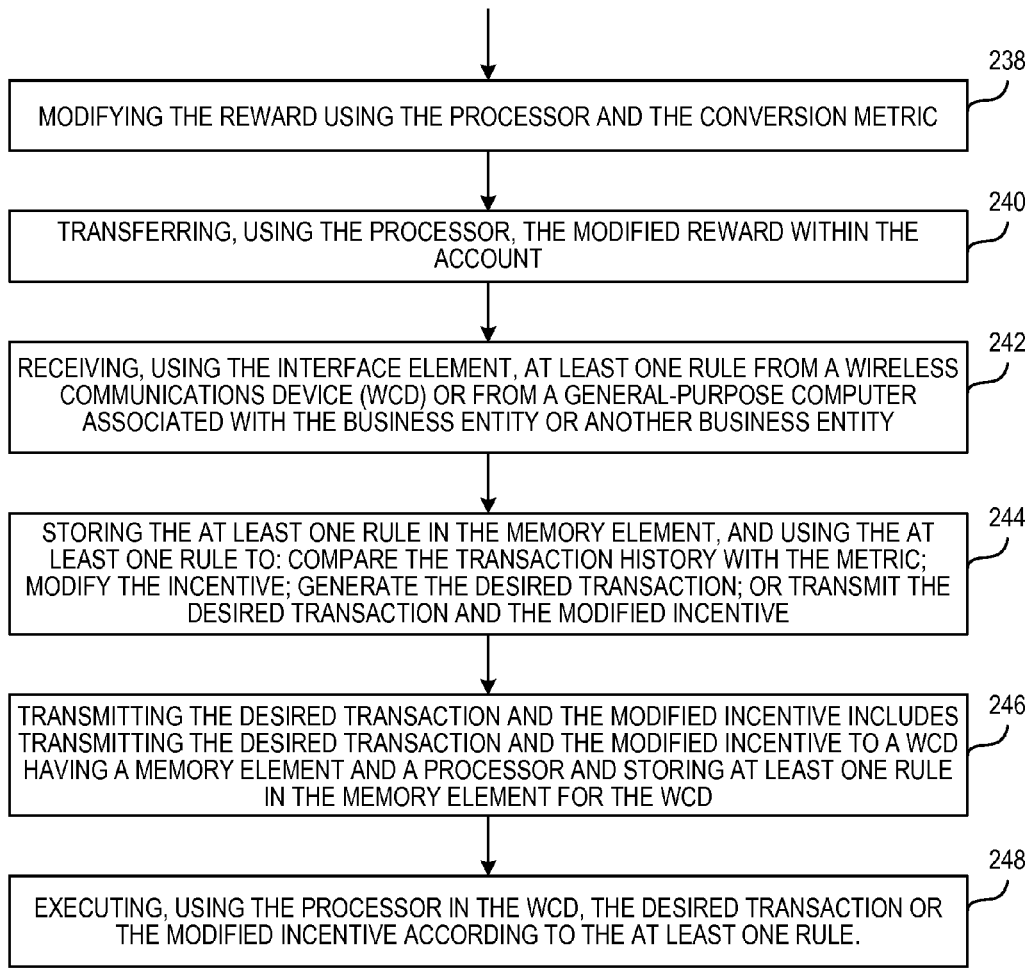

FIG. 2 is a flow chart illustrating a present invention computer-based method for managing an account having at least one sub-account. Although the method in FIG. 2 is depicted as a sequence of numbered steps for clarity, no order should be inferred from the numbering unless explicitly stated. The method starts at Step 200. Step 202 stores, in a memory element for at least one specially-programmed general purpose computer, a transaction history for and account, including a main account and at least one sub-account, with respect to a business entity, an incentive regarding the business entity previously offered to the account, and an artificial intelligence program (AIP). The transaction history includes at least one transaction involving the business entity and the main account, or the business entity and the at least one sub-account; step 204 compares, using a processor in the at least one specially-programmed general purpose computer, the transaction history with a metric; step 206 generates, using the processor and the comparison of the transaction history with the metric, a desired transaction involving the account and the business entity; step 208 modifies the incentive using the processor, the AIP, and the comparison of the transaction history with the metric (rewarding of the modified incentive is conditional upon execution of the desired transaction); and step 210 transmits, using an interface element for the at least one specially-programmed general purpose computer, the desired transaction and the modified incentive for presentation to a holder of the account.

In one embodiment, step 212 determines, using the processor and the AIP, the metric, and stores the metric in the memory element. In another embodiment, step 214 stores, in the memory element, data regarding the account, the data different than the transaction history; and step 216 generates, using the processor, the data, and the AIP, the metric; comparing the transaction history with the metric includes using the data; modifying the incentive includes using the data; generating the desired transaction includes using the data; or transmitting the desired transaction and the modified incentive includes using the data. In a further embodiment, comparing the transaction history with the metric includes using the AIP. In yet another embodiment, generating the incentive using the processor and the AIP.

In one embodiment, step 218 receives, using the interface element, data regarding a transaction, between the business entity and the account, transacted following transmission of the desired transaction and the modified incentive; step 220 compares, using the processor, the data with respect to the desired transaction; and step 222, for compliance of the transaction with the desired transaction, authorizes, using the processor, reward of the modified incentive; or step 224, for non-compliance of the transaction with the desired transaction, further modifies, using the processor and the AIP, the modified incentive according to the comparison of the transaction and the desired transaction.

In one embodiment, step 226 generates, using the processor and the AIP, at least one rule; and step 228 stores the at least one rule in the memory element. Modifying the incentive includes using the at least one rule. In another embodiment, step 230 stores at least one rule in the memory element; and step 232 modifies, using the processor and the AIP, the at least one rule according to the comparison of the transaction history with the metric. Generating the desired transaction includes using the at least one modified rule, or modifying the incentive includes using the at least one modified rule.

In one embodiment, step 234 generates, using the processor, the transaction history, and the AIP, a conversion metric; step 236 receives, using the interface element, a request to transfer a reward within the account; step 238 modifies the reward using the processor and the conversion metric; and step 240 transfers, using the processor, the modified reward within the account.

In one embodiment, step 242 receives, using the interface element, at least one rule from a wireless communications device (WCD) or from a general-purpose computer associated with the business entity or another business entity; step 244 stores the at least one rule in the memory element, and comparing the transaction history with the metric includes using the at least one rule; modifying the incentive includes using the at least one rule; generating the desired transaction includes using the at least one rule; or transmitting the desired transaction and the modified incentive includes using the at least one rule. In another embodiment, transmitting the desired transaction and the modified incentive includes transmitting the desired transaction and the modified incentive to a WCD having a memory element and a processor, and step 246 stores at least one rule in the memory element for the WCD. Step 248 executes, using the processor in the WCD, the desired transaction or the modified incentive according to the at least one rule.

The following describes a present invention method for managing an account having at least one sub-account. Although the method is presented as a sequence of steps for clarity, no order should be inferred from the sequence unless explicitly stated. A first step stores, in a memory element for at least one specially-programmed general purpose computer, a transaction history for the account with respect to a business entity and an artificial intelligence program (AIP), wherein the transaction history includes at least one transaction involving the business entity and the main account or the business entity and the at least one sub-account; a second step compares, using a processor in the at least one specially-programmed general purpose computer, the transaction history with a metric; a third step generates, using the processor, the AIP, and the comparison of the transaction history with the metric, a desired transaction involving the account and the business entity; a fourth step generates, using the processor, the AIP, and the comparison of the transaction history with the metric, an incentive, rewarding of the incentive conditional upon execution of the desired transaction; and a fifth step, transmits, using an interface element for the at least one specially-programmed general purpose computer, the desired transaction and the incentive for presentation to a holder of the account.

The following should be viewed in light of FIGS. 1 and 2 and any discussion provided supra. Although the following non-limiting discussion is directed to a present invention system, it is understood that the discussion also is applicable to a present invention method. System 100 can be described as a reward program for an account including a number of sub-accounts contained under one main account. In one embodiment, each sub-account gains rewards that are tracked under the main account. The system can output special reward offers, for example, incentives 122 and 130, to the main account and sub-accounts to motivate purchasing behavior, for example, to motivate execution of the desired transaction. The system can track the success of the offers, for example via the transaction history or input 134, and automatically modify subsequent desired transactions and incentives based on the success of previous desired transactions and incentives utilizing artificial intelligence, for example, genetic algorithms or AIP 124, and feedback techniques. In another embodiment, rules are used in conjunction with the artificial intelligence.

In one embodiment, the system scores main and sub-accounts and places various accounts into various classes, for example, classification 162. In another embodiment, the processor uses artificial intelligence and the transaction history or classification to identify like accounts and to generate or modify the same or similar desired transactions or incentives for accounts so identified.

In one embodiment, the system is configured to offer up front rewards in exchange for commitments from the main or sub-accounts to execute desired transactions over time. Penalties can be applied to the account if the account is non-compliant with the commitment. In another embodiment, the processor, and in a further embodiment, using the AIP, generates or modifies one or more of the following, for example, using the transaction history:

1. the upfront reward to the main or sub-account holders
2. the required commitment
3. the penalty for non-compliance with the commitment
4. the penalty adjustment
5. the grace period before a penalty is applied to non-compliant behavior In one embodiment, the processor, and in a another embodiment, using the AIP, generates or modifies the incentive according to one or more of the following:

1. payment type, for example, credit card usage
2. frequency of transactions, for example, purchases from the business entity
3. number of sub-accounts present
4. check size, for example
5. bonus items in purchase The following is a non-limiting example of the present invention. A main, or master, account holder, Jim, has three sub-account holders registered: Peggy, Sue, and Billy. The system tracks purchasing behavior, for example, using the transaction history, and determines that Jim has shopped with Peggy three times, Sue two times and Billy one time (each shopping event is considered a transaction) in the previous month. The system generates an incentive, for example, incentive 122, and a desired transaction for transmission to Jim and Billy. The desired transaction is three transactions including both Jim and Billy in the next month. The incentive is 200 bonus points for Billy, 200 bonus points for Jim, and 100 bonus points each for Peggy and Sue. The system then determines if Jim and Billy shopped three times in the subsequent month, for example, using input 134 and the transaction history. If Jim and Billy have not executed the desired transaction (three transactions in the subsequent month), the system initiates an iterative process to entice Jim and Billy to comply with the desired transaction(s). For example, the system successively modifies the incentive, for example, generating incentive 130, and successively presents the desired transaction and modified incentive until Jim and Billy comply with the desired transaction. For example, the system successively increases the bonus points offered for compliance with the desired transaction until Jim and Billy execute the desired transaction.

In another non-limiting example of the present invention, the system determines, for example, using the transaction history, that Jim typically has had no more than two sub-account holders present with him during past transactions. To encourage the participation of more sub-accounts, the system generates an incentive, for example, incentive 122, to reward Jim with 200 bonus points if Jim is compliant with a desired transaction consisting of three sub-account holders participating in at least two of Jim's transactions for the next month. The incentive can be modified as described above to encourage Jim's compliance if the system determines that Jim is being non-compliant, for example, by using input 134 and the transaction history.

In one embodiment, credit card embodiment rewards are allocated on a website after execution of a desired transaction. In another embodiment, transferring reward points from a main to a sub-account or from one sub-account to another includes use of a conversion metric, for example, bonus or penalty for transferring. The master account holder, or a sub-account holder with permissions, can log in to a website and allocate reward points earned from making purchases at one or more retailers.

In one embodiment, at a retail buying club, for example, Sam's Club, a master account holder can check in at the door via a hand held device that prompts the master account holder to enter the sub-account holders that are present. The store employee operating the handheld device can verify that the sub-account holders registered as present by the master account holder are actually present. In another embodiment, a fraud system can detect if there are too many sub-accounts in a party based on the transaction amount and adjust reward retroactively.

In one embodiment, a master account holder can use a WCD, for example, a cell phone or other handheld device to process the transaction. If the master account holder is registered in the reward program, a prompt can be sent from the central system to the master account holder device prompting the registration of sub-account holders available. Email notifications and offers can be sent to the master account holder device, and also to devices of sub-account holders. Commonly-owned U.S. patent application Ser. No. 11/985,268, filed Nov. 14, 2007 and commonly-owned U.S. patent application Ser. No. 12/008,428, filed Jan. 11, 2008 are applicable to the operations described above for a WCD.

In one embodiment, for any or all of those instances of a present invention system or method in which an artificial intelligence program or generic algorithm is used, a rule or set of rules, for example, rule 136, is used in conjunction with the artificial intelligence program or generic algorithm. The operation of an artificial intelligence program or generic algorithm with a rule or set of rules is described in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

The present invention leverages existing or future marketing systems, marketing programs, loyalty programs, sponsor programs, coupon programs, discount systems, incentive programs, or other loyalty, marketing, or other similar systems, collectively, "marketing systems" by adding programming logic, self-learning, and self-adaptation to generate or modify a desired transaction or incentive, with respect to managing accounts, for motivating a desired behavior by a customer. The present invention can use any, all, or none of the following considerations as part of generating or modifying the desired transaction, the incentive, or the metric, comparing the transaction history with the metric, or transmitting the desired transaction or incentive, for example, by adding programming logic, self-learning, and self-adaptation as noted supra:

1. One or more business, customer or sponsor objectives, for example, metric 126.
2. Temporal parameters, such as, time of day, day of week, month, or year.
3. Any one or more data or variables available or accessible, including, for example, any customer, business or sponsor information, such as, membership in a loyalty or other marketing program, ordering preferences or history, current sales volumes or budgets or targets, current or planned local, regional or national marketing programs or objectives, device preferences, current speed of service, quality of service or other operating data, budgets, objectives or trends, etc.

In one embodiment, the present invention employs any, all, or none of the following considerations as part of generating or modifying the desired transaction, the incentive, or the metric, comparing the transaction history with the metric, or transmitting the desired transaction or incentive, for example, by adding programming logic, self-learning, and self-adaptation as noted supra:

1. Parameters or data regarding the customer, for example, using the transaction history or data 132. For example, the incentive can be made more attractive to the customer if the customer is a loyal customer or if the business entity wishes to entice the customer to purchase a good seldom ordered by the customer in the past. Proclivity to accept or reject offers of the same or other types. Customer objectives also can be considered.
2. The customer class or type. For example, the incentive can be made more attractive to the customer if the customer is grouped with loyal customers or if the business entity wishes to entice the customer group to purchase a good seldom ordered by the customer group in the past. Customer group objectives also can be considered.
3. Temporal parameters, such as the time of day, week, month, or year. For example, the system can reduce prices in the incentive to encourage sales during times of historic low sales volume or increase prices in the incentive during times of historic high sales volume.
4. The good or service involved in a past, current, or possible future transaction between the customer and the business entity. For example, incentives for items with a short shelf life can be made more attractive to encourage a larger volume of orders for the items.
5. Inventory on hand. For example, incentives can be modified to encourage sale of overstocked items or to maximize profits for items in short supply.
6. Specifics of a transaction. With the use of the AIP, system 100 can automatically, dynamically, and intelligently adapt the desired transaction or the incentive to any parameter associated with a particular transaction. Further, the parameters to which the system is to adapt the price can be automatically, dynamically, and intelligently selected or modified.
7. Physical parameters of the transaction process. For example: order entry device, e.g., point of sales (POS) terminal, kiosk, cell phone, PDA, laptop, IED, etc.; POS device or station, e.g., front counter, drive through, retail station, call center, location on counter, e.g., first station vs. second, third fourth or other station, etc.; output display device (e.g., customer facing display, kiosk, cell phone, PDA, laptop, IED, etc.); or in a quick serve restaurant, the desired transaction or the incentive can be modified to encourage use of self-service kiosks, which may optimize revenue for the business entity, or to discourage use of a point of sales station attended by an employee.
8. Rate of sale of items. For example, prices in the incentive can be increased for goods that are selling rapidly or reduced for goods that are selling slowly.
9. Reservations. For example, to encourage customers to make reservations at a sit down restaurant, prices in the incentive can be reduced for orders placed by customers making reservations.
10. Regular orders. For example, based on the transaction history, prices in the incentive for a restaurant can be reduced for items regularly ordered by a customer or prices can be reduced on items rarely ordered by a customer to encourage the customer to order the rarely ordered items.
11. Employee. For example, to increase prices for incentives handled by an employee with a high success rate of handling such incentives.
12. The nature of the transaction, for example, determining feasible upsells to include in the desired transaction.
13. The location at which the transaction is occurring, for example, lowering the price in the incentive to encourage patronage at a location.
14. Business Information or objectives, for example, metric 126.
15. Sponsor Information or objectives.
16. Marketing Program Type.
17. Opt In Information.
18. Payment method or terms or conditions of payment.
19. Marketing Message Contents.
20. Marketing Offer Objectives.
21. Expected or Actual System Results or tracking data.
22. System determined discounts or other incentives required to achieve desired results.
23. One or more table entries provided by one or more end users, for example, a system administrator.
24. One or more rules provided by one or more end users, for example, a system administrator.
25. One or more genetic algorithms or other AI based rules or determination methods.
26. Point within transaction, e.g., pre-order, mid-order, post order, etc.
27. Loyalty program information.
28. Current store activity, e.g., high or low volumes of transactions.
29. Customer survey information.
30. Financial considerations, such as total current price/profit, total expected price/profit, regular or discounted price, gross margins, profit margins, labor rates, labor availability, marketing funds available, or third party funds available, budget.
31. Expectation of accept or reject of one or more offers in the desired transaction at one or more price points in the incentive.
32. Current, prior or expected level of dilution, gaming, fishing, accretion.
33. Business, customer, or employee target goals.
34. Current or planned local, regional or national or other marketing campaigns, including, for example, product introductions, price or other promotions, print, radio or television or other advertisements, e.g., newspaper coupon drops, etc.
35. Business, customer, sponsor, or system objectives.
36. Business, customer, sponsor, third party, or system information.
37. Any other information, data, rules, system settings, or otherwise available to the marketing system or disclosed invention or the POS system or other system designed to deliver one or more marketing messages, offers, or coupons, etc.

38. Any combination or priority ranking of any two or more of the foregoing.

In one embodiment, marketing messages, content, desired transactions, metrics, histories, incentives, or other parameters, are created or maintained centrally or in a distributed network, including, for example, locally. Such management may be accomplished via any applicable means available, including, for example, making use of existing, e.g., off the shelf or customized tools that provide for such creating, management or distribution.

In another embodiment, in an effort to further enhance generating or modifying the desired transaction, the incentive, or the metric, comparing the transaction history with the metric, or transmitting the respective data, or to otherwise improve one or more aspects of the present invention, the invention may access certain information from existing systems, including, for example, existing POS databases, such as customer transaction data, price lists, inventory information or other in or above store, for example, location data, including, but not limited to data in a POS, back office system, inventory system, revenue management system, loyalty or marketing program databases, labor management or scheduling systems, time clock data, production or other management systems, for example, kitchen production or manufacturing systems, advertising creation or tracking databases, including click through data, impressions information, results data, corporate or store or location financial information, including, for example, profit and loss information, inventory data, performance metrics, for example, speed of service data, customer survey information, digital signage information or data, or any other available information or data, or system settings data.

In one embodiment, each location associated with the present invention establishes its own rules, uses its own AIP or generic algorithm, or learns from local customer behavior or other available information. In another embodiment, the present invention shares some or all available information or results data among any two or more or all locations or locations that fall within a given area, region, geography, type, or other factors, such as customer demographics, etc., and makes use of such information to improve the present invention's ability to perform present invention operations described supra and infra.

For example, when using an AI based system, such as disclosed in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007," one location may discover or otherwise determine that a certain type or class of desired transaction or incentive is particularly effective. By sharing such information among other locations, for example, similar locations, the present invention can begin to make use of the same or similar desired transactions or incentives in other generally similar locations or with similar customers or classifications of customers so as to improve the performance of one or more other such locations or all locations. In this fashion, the present invention can learn which desired transactions or incentives more quickly or generally achieve the desired results or improve trends towards such results. Likewise, the present invention can more quickly determine which desired transactions or incentives do not yield the desired results or determine how long such desired transactions or incentives are required to achieve the desired results.

In a further embodiment, desired transactions or incentives are provided or subsidized by one or more third parties, including, for example, third party sponsors. For example, a vendor supplying an item in a desired transaction could subsidize an incentive to encourage acceptance of the item. In another example, such an offer may be partially or fully subsidized by an unrelated third party sponsor. For example, as part of a desired transaction, a telecommunications company offers to view an advertisement for telecommunications company or fill out a survey or perform some other action or accept a subsequent or related optional or required offer, etc.

In one embodiment, customers are grouped by the processor according to similarities in transaction history or other customer information, for example, using and history 110 or data 132. The system generates or modifies the desired transaction, the incentive, or the metric, compares the transaction history with the metric, or transmits the desired transaction or incentive for use with the grouped customers.

In one embodiment, the operations of the processor and the AIP, described supra and infra, include the generation of executables as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, the present invention generates or modifies the desired transaction, the incentive, or the metric, compares the transaction history with the metric, or transmits the respective data based upon other performance data or results, for example, the transaction history. In another embodiment, the present invention determines the impact of transaction histories, account data, metrics, desired transactions, incentives, or presentations on the ability or proclivity of an employee or customer to game or fish the present invention. The system avoids or ceases transaction histories, account data, metrics, desired transactions, incentives, or presentations and/or changes the type of transaction histories, account data, metrics, desired transactions, incentives, or presentations provided or suppressed. In one embodiment, one or more of the above operations are performed using the AIP.

In one embodiment, transaction histories, account data, metrics, desired transactions, incentives, or presentations vary from employee to employee, from customer to customer, from account to account, or from time to time, or one or more of these may be consistent regardless of the employee, customer, account, or time or other information. In a another embodiment, where transaction histories, account data, metrics, desired transactions, incentives, or presentations vary, such transaction histories, account data, metrics, desired transactions, incentives, or presentations are determined via any applicable means and using any available information to make such determination, including, for example, any available customer, account, business, or sponsor information or any one or more customer, account, business, or sponsor objectives or any combination of the forgoing. In a further embodiment, transaction histories, account data, metrics, desired transactions, incentives, or presentations are further determined or modified based upon information or needs or business objectives of one or more suppliers or competitors of such suppliers. For example, if a WCD is within a geographical area for a location selling competing items A and B, a desired transaction and incentive are generated and transmitted for one or both of the items and vendors for the items underwrite the cost for the price to the business entity. In one embodiment, one or more of the above operations are performed using the AIP.

In one embodiment, a present invention system generates, modifies, or uses transaction histories, account data, metrics, desired transactions, incentives, or presentations based upon current or previous buying habits or any other available information regarding a customer. If for example, an end user is a loyal customer for item A, the present invention can increase the price in the incentive for item A or decrease the price in the incentive for a different item depending upon any known factors, for example, did the customer receive or act upon an offer for item B. If the customer did receive or act upon a reminder for item B, in another embodiment, the present invention reduces a cost in the incentive for item A as a blandishments to purchase item A instead of item B, or matches or beats a price for item B, or queries such loyal (or other) customer to determine what price such customer would require to purchase item A. In this fashion a competitive environment is created.

In one embodiment, the end user of a present invention system modifies the rules or method of operation so as to favor itself. For example, in the previous example, if the producer of item A were the sole end user of the present invention, the producer may choose to not share any part or all of any such customer information or may use knowledge of any reminder regarding item B to its benefit. In another example, if a grocery chain was the sole end user of the present invention, the end user may choose to provide equal access to the present invention or favor one or more of its suppliers based upon any one or more of its business objectives, for example, the profitability or perceived or actual quality or consistency or pricing of such one or more suppliers. In one embodiment, one or more of the above operations are performed using the AIP.

In one embodiment, in order to receive a desired transaction and incentive, account holders, for example, existing or prospective customers are required to opt in to a cellular marketing program or some other loyalty program indicating their desire or providing permission for such marketing system or the business entity to send one or more such desired transaction and incentive. In this fashion, only those interested in such communications will be sent such communications.

In a further embodiment, the desired transaction or incentive is modified for prospective customers having an identity previously provided by an existing customer, as described in commonly-owned U.S. patent application Ser. No. 12/217,863, titled: "SYSTEM AND METHOD FOR PROVIDING INCENTIVES TO AN END USER FOR REFERRING ANOTHER END USER," inventors Otto et al., filed Jul. 9, 2008, which application is incorporated by reference herein. For example, if an existing quick service restaurant chain customer provides one or more prospective customer's identity, when such prospective customer is identified during a transaction at a quick service restaurant chain's participating locations, the present invention generates or modifies the desired transaction or incentive or presentation of the desired transaction or incentive to encourage participation in the program and provides the identity of the referring party along with such desired transaction or incentive. In one embodiment, one or more of the above operations are performed using the AIP.

In one embodiment, the present invention improves results over time or with use of the invention. Such improvement or optimization can be accomplished via any means necessary including any of several methods well known in the art or as disclosed by applicants and incorporated herein by reference, including, for example, commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; and commonly-owned U.S. patent application titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008. For example, statistical methods can be used to determine which transaction histories, account data, metrics, desired transactions, incentives, or presentations generally yield the desired or optimal or generally better results, or such results may be determined using artificial intelligence, for example, one or more genetic algorithms, or a present invention administrator/operator can review results reports and then provide manual weighting criteria to further define or control the present invention, or a combination of these and other well known methods may be employed in any combination or in any order or priority.

In one embodiment, a present invention incentive includes a discount. Such discounts can be associated or applied to specific items, or to an entire order. In one embodiment, discounts are determined based upon rules established by management of the present invention or as established or modified from time to time by any authorized personnel, or may be initially established or modified using a learning system, e.g., a genetic algorithm. In any such case, the present invention can make use of any or all available information, including, but not limited to transaction history and customer information. Discounts can be designed to maximize, minimize or optimize any one or more business or customer objectives as desired or indicated. In another embodiment, the discount, if any, is presented to the customer as a percentage discount or as a cents or other amount off discount. In one embodiment, one or more of the above operations are performed using the AIP.

In one embodiment, discounts in incentives are used/tried relatively sparingly to determine the price elasticity of customers, both as a whole and/or by class, group, demographics, type or order contents, base order amounts, and/or specific customer's buying habits and acceptance/rejection information. In this fashion, the present invention can, over time, yield optimal results by learning or otherwise determining what price reductions, if any, are required given the known information. For example, if a sub-account rarely transacts with the main account, the present invention could include a price offering a 10% discount in the incentive if the sub-account and the main account are involved in the same transaction. If the account holders reject such offer, the present invention could offer a larger discount in the incentive, for example, for a 20% discount. Once the present invention determines account holder price points, and/or holders become habituated to executing the desired transaction, the present invention can reduce or eliminate related discounts or other incentives. In one embodiment, one or more of the above operations are performed using the AIP.

In one embodiment, the present invention, having acquired data regarding customer price elasticity and other information, uses such information to determine other prices for the same or generally similar customers, e.g., other customers who purchase one item but not typically another. In another embodiment, using such logic, the present invention determines classifications of customers and leverage use of such information by providing a desired transaction or incentive that is also optimized from the location or location management perspective/objectives. In one embodiment, one or more of the above operations are performed using the AIP.

In one embodiment, an administrator can add or change or otherwise modify the previous listing, or data, or determine the order of priority or preference of each such discrimination factors or preferences or data, including, for example, location, payment or device, ranking each in order of such preference or providing table, rules or other entries to provide or assist or to support determining which are preferred or the amount of incentive available or increased or decreased incentive, as a percentage or absolute or relative or other dollar or other calculation method to determine what price modifications, if any to make, at which locations, devices or payment methods or other discriminating factors, for example, customer or business preferences or customer, business, sponsor or other entity information, objectives, rules or other available information or rules or system settings. By providing or otherwise manually or automatically determining such rankings, the disclosed invention can initially or continuously evaluate potential pricing and modify such pricing or provide other incentives to drive a desired percentage of business or customer transactions to one or more particular devices, locations or payment methods. In one embodiment, one or more of the above operations are performed using the AIP.

In one embodiment, the present invention provides such incentives initially, or on an ongoing basis or only until certain objectives are achieved or certain customers or all customers are generally habituated to compliance, for example, with a business objective such as a minimum check size, after which, in certain embodiments, the present invention may cease, temporarily or permanently making such price incentives based upon such discriminating factors, or may reduce the difference in incentives, or may only periodically provide such full discounts or reduced discounts so as to reinforce such behavior. In another embodiment, a system administrator or other end user establishes such rules or conditions. In one embodiment, one or more of the above operations are performed using the AIP.

In one embodiment, the present invention makes such determinations using an automated means. Such automated means includes, for example, a system that periodically or generally continuously tests different transaction histories, account data, metrics, desired transactions, incentives, or presentations or other methods, for example, user interfaces, or other benefits or incentives, and based upon such testing, determine which transaction histories, account data, metrics, desired transactions, incentives, or presentations or other benefits yield the desired compliance, for example, with a business objective such as a preferred payment method. Such automated system may periodically cease providing such incentives once it is determined that the desired customer behavior has been established, habituated or otherwise persists without need for such continued incentive. If such system subsequently determines that the desired behavior has ceased or fallen below a desired level, such system can then reinstate an appropriate incentive. When reinstating such incentive, for example, via transaction histories, account data, metrics, desired transactions, incentives, or presentations, the present invention can return to previously successful levels or can provide different transaction histories, account data, metrics, desired transactions, incentives, or presentations, on a temporary, periodic or permanent basis. Such reinstatement may be provided for all customers, certain customers, classes of customers, or only those customers that have ceased or have generally reduced their frequency of desired behavior. In one embodiment, one or more of the above operations are performed using the AIP.

In one embodiment, the present invention tests transaction histories, account data, metrics, desired transactions, incentives, or presentations or provides certain pricing on a periodic basis within a single location or among a plurality of locations so as to determine the extent or requirement regarding any such transaction histories, account data, metrics, desired transactions, incentives, or presentations or other benefits. For example, by testing incentive levels, the present invention can determine the level of incentive needed to attain a business goal, or such a system can further determine the extent of any gaming, dilution, diversion or accretion. By alternating offering and not offering incentive modification or by testing various levels of incentives, the present invention can better determine the optimal incentive, discount or benefits required, if any, to achieve the desired results, while minimizing or mitigating any undesirable effects of using or deploying such system. Such testing can be accomplished via any applicable or available means, including those previously disclosed by applicants herein and within the referenced applications, or randomly or using rules or AI based systems. By periodically testing or making changes to such transaction histories, account data, metrics, desired transactions, incentives, or presentations or benefits, the present invention can continually strive to achieve the optimal mix and level of transaction histories, account data, metrics, desired transactions, incentives, or presentations. By combining the use of one or more of a table, rules or AI based system, including, for example, as disclosed in the applications incorporated by reference herein, a more effective, responsive, adaptive, and dynamic marketing system may be developed and deployed that achieves optimal or nearly optimal results over both the short and long term.

In one embodiment, the present invention tests customers of one or more locations using, an incentive, for example, discounted pricing, while maintaining the regular prices at one or more other locations. By comparing the results data from such test and control groups of locations, the present invention can better determine which incentives are accretive or provide net benefit or are subject to gaming, fishing or other fraudulent or undesirable activities. Such testing can be performed within a single unit as well, by periodically offering such incentives to the same or similar customers or by randomly providing or not providing such incentives.

In one embodiment, the present invention makes use of a combination of such testing methodologies in order to best determine which desired transactions or incentives yield optimal or the best results given the present invention information, parameters or any one or more customer, business, sponsor or present invention objectives. For example, the present invention tests in a single or group of stores certain new or untested desired transactions or incentives, and, combines such test with a periodic modification of desired transactions or incentives, for example, toggling, between higher and lower price discounts, which toggling, may be random, 50/50, or may be intelligently determined, for example, using the AIP, based upon system information, and continue such test for a period of time, for example, one month, while comparing results of such tests with a similar number of stores in a control group, and then, switch the process, for example, test within the original control group and stop offering modified incentives within the original test group. In this fashion the present invention determines the effects of desired transaction or incentive modifications and the effect of such modifications on customers, customer buying habits, store or business results, or any other measures, including, for example, testing for dilution, diversion, accretion, gaming or fishing. In one embodiment, one or more of the above operations are performed using the AIP.

In one embodiment, a system administrator is able to enter or modify or delete or otherwise provide transaction histories, account data, metrics, desired transactions, incentives, or presentations using an interface provided for such purposes. When establishing messages or content of transaction histories, account data, metrics, desired transactions, incentives, or presentations, such administrator or other end user may be further permitted to designate which transaction histories, account data, metrics, desired transactions, incentives, or presentations are to be generally used when using a particular type of communications. For example, one type of transaction history, account data, metric, desired transaction, incentive, or presentation may be designated for use when communicating via cell phone and another transaction history, account data, metric, desired transaction, incentive, or presentation used for email and still other versions for each or all of the other various methods of communications. In another embodiment, the present invention tests each transaction history, account data, metric, desired transaction, incentive, or presentation with each such communications method to determine, partially or wholly, which transaction history, account data, metric, desired transaction, incentive, or presentation yields the best or optimal results over time or based upon any available information, including, for example, any available or otherwise accessible customer, business or sponsor information or objectives or by tracking actual activities and results or changes in behavior as expected or predicted by customers or other end users or classes or categories of uses or by device, location or payment method. In a further embodiment, one or more of the above operations are performed using the AIP.

The following is a listing of exemplary hardware and software that can be used in a present invention method or system. It should be understood that a present invention method or system is not limited to any or all of the hardware or software shown and that other hardware and software are included in the spirit and scope of the claimed invention.

1. Hardware:
  a. Central Controller or Local Controllers. The present invention can be managed by a central system on behalf of multiple business entities or locations or systems associated with portions of the multiple business entities or locations can implement the present invention.
  b. Retailer System 1-n
  c. End User Device 1-n
2. Software:
  a. Desired Transaction Program: generates desired transactions; modifies desired transactions, for example, based on performance metrics; generates and modifies presentations for desired transactions; and manages desired transactions.
  b. Incentive Program: generates incentives; modifies incentives, for example, based on performance metrics; generates and modifies presentations for incentives; and manages incentives.
  c. Reward Program: manages available and active programs regarding generation, allocation, and dissemination of rewards.
  d. Reward Alteration Program: alters reward programs based on performance data.

The following is a listing of exemplary data bases that can be used in a present invention method or system. It should be understood that a present invention method or system is not limited to any or all of the databases shown and that other databases are included in the spirit and scope of the claimed invention.

Account Database-stores master account information.
Sub-account Database-stores sub account information.
Transaction Database-stores transaction data including reward program data and transaction histories, for example, history 110.
Rewards Database-stores available rewards programs.
Rewards Rules Database-stores rules for rewards programs.
Reward Incentive Database-stores incentives for rewards programs.
Reward Incentive Rules Database-stores rules for making rewards program incentives.
Active Reward Programs Database-stores active rewards programs.
Account and Sub-account Score/Class Database-stores scoring data for accounts and sub accounts.
Available Penalty Database-stores penalties that can be associated with reward programs.
Available Obligation Database-stores obligations that can be associated with reward programs.
Available Alerts Database-stores alerts that can be associated with reward programs.
Alerts Database-stores active alerts.
Alerts Rules Database-stores rules for making alerts.

It is to be understood that the embodiments and variations shown and described herein are merely illustrative of the principles of this invention and that various modifications may be implemented by those skilled in the art without departing from the scope and the spirit of the invention. For example, while the invention has been illustrated as being implemented using particular computer systems including hardware components such as a computer, POS terminals, portable employee terminals, and input and output devices, the invention could also be implemented using other hardware components and/or other interconnections between such components. Also, while the invention has been described as being implemented using a computer, some or all of the functionality could alternatively reside in a POS terminal or other computing device (e.g., a headset). The invention could also be implemented using discrete hardwired components instead of computers. Further, while the above description refers to particular databases, other databases or data structures could be used. In addition, while various embodiments of methods in accordance with the invention have been discussed which include specific steps listed in specific orders, a person of skill in the art will recognize that these steps can be performed in different combinations and orders. While other modifications will be evident to those skilled in the art, the present invention is intended to extend to those modifications that nevertheless fall within the scope of the appended claims.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A method comprising:
    storing, in a memory element for at least one specially-programmed general purpose computer:
        a transaction history for an account with respect to a business entity, and
        a first incentive regarding the business entity previously offered to the account,
        wherein the transaction history includes at least one of:
            a transaction involving the business entity and the account, or
            a transaction involving the business entity and a sub-account of the account;
    determining, using a processor in the at least one specially-programmed general purpose computer, a metric;
    generating, using the processor and based on the transaction history and the metric, a desired transaction involving a holder of the account and the business entity;
    generating a second incentive, using the processor, based on an artificial intelligence program (AIP), the transaction history, and the metric; and
    transmitting, using an interface element for the at least one specially-programmed general purpose computer, the desired transaction and the second incentive for presentation to the holder of the account.

2. The method of claim 1 further comprising storing the metric in the memory element.

3. The method of claim 1 further comprising:
    storing, in the memory element, data regarding the account, the data being different than the transaction history; and
    generating, using the processor, the metric based on the data and the AIP.

4. The method of claim 1 wherein generating the desired transaction comprises comparing the transaction history with the metric.

5. The method of claim 1 in which generating the second incentive comprises:
    generating the second incentive using the processor and the AIP.

6. The method of claim 1 further comprising:
    receiving, using the interface element, data regarding a transaction, between the business entity and the account, transacted following transmission of the desired transaction and the second incentive;
    comparing, using the processor, the data with respect to the desired transaction; and,
    for compliance of the transaction with the desired transaction, authorizing, using the processor, reward of the second incentive; or,
    for non-compliance of the transaction with the desired transaction, modifying, using the processor and the AIP, the second incentive according to the comparison of the transaction and the desired transaction.

7. The method of claim 1 further comprising:
    generating, using the processor and the AIP, at least one rule; and,
    storing the at least one rule in the memory element, wherein generating the second incentive includes using the at least one rule.

8. The method of claim 1 further comprising:
    storing at least one rule in the memory element; and,
    modifying, using the processor and the AIP, the at least one rule based on the transaction history and the metric, and wherein generating the desired transaction includes using the at least one modified rule, or wherein generating the second incentive includes using the at least one modified rule.

9. The method of claim 1 further comprising:
    generating a conversion metric, using the processor and the AIP, based on the transaction history;
    receiving, using the interface element, a request to transfer a reward within the account;
    modifying, using the processor, the reward based on the conversion metric; and,
    transferring, using the processor, the modified reward within the account.

10. The method of claim 1 further comprising:
    receiving, using the interface element, at least one rule from a wireless communications device (WCD); and
    storing the at least one rule in the memory element, and wherein at least one generating the second incentive, generating the desired transaction and transmitting the desired transaction is performed using the at least one rule.

11. The method of claim 1 wherein transmitting the desired transaction and the second incentive comprises:
    transmitting the desired transaction and the second incentive to a wireless communications device (WCD).

12. A system comprising:
    a processor;
    an interface element in communication with the processor; and
    a computer-readable memory storing an artificial intelligence program (AIP) and instructions configured so that when executed by the processor the instructions direct the processor to perform a method, the method comprising:
    storing, in the computer-readable memory:
        a transaction history for an account with respect to a business entity, and
        a first incentive regarding the business entity previously offered to the account,
        wherein the transaction history includes at least one of:
            a transaction involving the business entity and the account, or
            a transaction involving the business entity and a sub-account of the account;
    determining a metric;
    generating, based on the transaction history and the metric, a desired transaction involving a holder of the account and the business entity;
    generating a second incentive based on the AIP, the transaction history, and the metric; and
    transmitting, using the interface element, the desired transaction and the second incentive for presentation to the holder of the account.

13. The system of claim 12 wherein the instructions are further configured to direct the processor to perform:
    storing the metric in the computer-readable memory.

14. The system of claim 12 wherein the instructions are further configured to direct the processor to perform
    storing data regarding the account in the computer-readable memory, the data being different than the transaction history; and
    generating the metric based on the data and the AIP.

15. The system of claim 12 wherein generating the desired transaction comprises comparing the transaction history with the metric.

16. The system of claim 12 wherein generating the second incentive comprises:
    generating the second incentive using the AIP.

17. The system of claim 12 wherein the instructions are further configured to direct the processor to perform:
- receiving, via the interface element, data regarding a transaction between the business entity and the account, transacted following transmission of the desired transaction and the second incentive; and
- comparing the data with respect to the desired transaction; and,
- for compliance of the transaction with the desired transaction, authorizing reward of the second incentive; or,
- for non-compliance of the transaction with the desired transaction, modifying, using the AIP, the second incentive according to the comparison of the transaction and the desired transaction.

18. The system of claim 12 wherein the instructions are further configured to direct the processor to perform:
- generating, using the AIP, at least one rule; and,
- storing the at least one rule in the memory element, wherein generating the second incentive includes using the at least one rule.

19. The system of claim 12 wherein the instructions are further configured to direct the processor to perform:
- storing at least one rule in the memory element; and,
- modifying, using the processor and the AIP, the at least one rule based on the transaction history and the metric, and wherein generating the desired transaction includes using the at least one modified rule, or wherein generating the second incentive includes using the at least one modified rule.

20. The system of claim 12 wherein the instructions are further configured to direct the processor to perform:
- generating a conversion metric, using the AIP, based on the transaction history;
- receiving, using the interface element, a request to transfer a reward within the account;
- modifying the reward based on the conversion metric; and,
- transferring, using the processor, the modified reward within the account.

21. The system of claim 12 wherein the instructions are further configured to direct the processor to perform:
- receiving, using the interface element, at least one rule from a wireless communications device (WCD); and
- storing the at least one rule in the computer-readable memory, and wherein at least one of generating the second incentive, generating the desired transaction and transmitting the desired transaction is performed using the at least one rule.

22. The system of claim 12 wherein transmitting the desired transaction and the second incentive comprises:
- transmitting the desired transaction and the second incentive to a wireless communications device (WCD).

23. A method comprising:
- storing, in a memory element for at least one specially-programmed general purpose computer, a transaction history for an account with respect to a business entity and an artificial intelligence program (AIP), wherein the transaction history includes at least one transaction involving the business entity and the main account;
- comparing, using a processor in the at least one specially-programmed general purpose computer, the transaction history with a metric;
- generating, using the processor, the AIP, and the comparison of the transaction history with the metric, a desired transaction involving the account and the business entity;
- generating, using the processor, the AIP, and the comparison of the transaction history with the metric, an incentive, wherein rewarding of the incentive is conditional upon execution of the desired transaction; and,
- transmitting, using an interface element for the at least one specially-programmed general purpose computer, the desired transaction and the incentive for presentation to a holder of the account.

24. A system comprising:
- a memory unit, for at least one specially programmed general-purpose computer, for storing a transaction history for an account with respect to a business entity and an artificial intelligence program (AIP), wherein the transaction history includes at least one transaction involving the business entity and the main account;
- a processor for the at least one specially programmed general-purpose computer for:
  - comparing the transaction history with a metric;
  - generating, using the AIP and the comparison of the transaction history with the metric, a desired transaction involving the account and the business entity; and,
  - generating, using the AIP and the comparison of the transaction history with the metric, an incentive, wherein rewarding of the incentive is conditional upon execution of the desired transaction; and,
- an interface element, for the at least one specially programmed general-purpose computer, for transmitting the desired transaction and the incentive for presentation to a holder of the account.

* * * * *